(12) United States Patent
Baldwin et al.

(10) Patent No.: US 8,527,161 B2
(45) Date of Patent: Sep. 3, 2013

(54) VEHICLE WITH TRANSMISSION COOLING SYSTEM

(75) Inventors: Reid Alan Baldwin, Howell, MI (US); John Edward Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 13/010,984

(22) Filed: Jan. 21, 2011

(65) Prior Publication Data
US 2012/0191306 A1   Jul. 26, 2012

(51) Int. Cl.
*F16D 13/00* (2006.01)
(52) U.S. Cl.
USPC ... 701/51; 192/113.1; 192/113.2; 192/113.23
(58) Field of Classification Search
USPC ............ 701/51, 67, 22, 65; 188/71.6, 246 A; 192/113.1–113.26
See application file for complete search history.

(56) References Cited

U.S. PATENT DOCUMENTS

| | | |
|---|---|---|
| 1,024,737 A | 4/1912 | Miller |
| 2,198,792 A | 4/1940 | Schjolin |
| 2,205,629 A | 6/1940 | Peterson |
| 2,310,203 A | 2/1943 | Banker |
| 2,777,965 A | 1/1957 | Winther |
| 2,869,659 A | 1/1959 | Mayo |
| 3,007,561 A | 11/1961 | Harting |
| 3,171,527 A | 3/1965 | Ott |
| 3,202,253 A | 8/1965 | Merritt et al. |
| 3,251,437 A | 5/1966 | Moyer et al. |
| 3,335,834 A | 8/1967 | Horst-Egon Wach |
| 3,661,238 A | 5/1972 | Davies |
| 3,664,467 A | 5/1972 | Lucien et al. |
| 4,020,937 A | 5/1977 | Winter |
| 4,294,343 A | 10/1981 | Reh |
| 4,382,497 A | 5/1983 | Sakai et al. |
| 4,561,522 A | 12/1985 | Dayen |
| 4,657,128 A | 4/1987 | Fujito et al. |
| 4,721,195 A | 1/1988 | Majima |
| 4,846,315 A | 7/1989 | Dayen |
| 4,923,043 A | 5/1990 | Okuno |
| 5,072,816 A | 12/1991 | Takeuchi et al. |
| 5,224,578 A * | 7/1993 | Rheinheimer et al. ..... 192/113.1 |
| 5,289,908 A | 3/1994 | Hakon |
| 5,400,889 A | 3/1995 | Bell et al. |
| 5,638,932 A | 6/1997 | Mikukami |
| 5,722,524 A | 3/1998 | Mikukami et al. |
| 5,732,808 A | 3/1998 | Viola et al. |
| 5,845,757 A | 12/1998 | Csonka |
| 5,857,547 A | 1/1999 | Dequesnes |
| 5,904,234 A | 5/1999 | Kosumi et al. |

(Continued)

FOREIGN PATENT DOCUMENTS

| | | |
|---|---|---|
| CN | 1920318 | 9/2006 |
| GB | 2097873 | 11/1982 |

(Continued)

*Primary Examiner* — Thomas Tarcza
*Assistant Examiner* — Kevin Myhre
(74) *Attorney, Agent, or Firm* — James Dottavio; MacMillan, Sobanski & Todd, LLC (57) ABSTRACT

The present disclosure relates to a control circuit for a vehicle transmission cooling system having a controller configured to control an air compressor to selectively pressurize a transmission clutch housing and provide air to an alternative vehicle subsystem (or subsystems).

11 Claims, 5 Drawing Sheets

(56) References Cited

U.S. PATENT DOCUMENTS

| | | |
|---|---|---|
| 5,996,757 A | 12/1999 | Hofmann et al. |
| 6,129,191 A | 10/2000 | Kummer et al. |
| 6,145,633 A | 11/2000 | Niederstadt et al. |
| 6,151,766 A | 11/2000 | Everett |
| 6,279,709 B1 | 8/2001 | Orlamunder |
| 6,293,370 B1 | 9/2001 | McCann et al. |
| 6,352,147 B1 | 3/2002 | Orlamunder et al. |
| 6,568,518 B2 | 5/2003 | Sarar |
| 6,745,884 B2 | 6/2004 | Hick et al. |
| 6,823,975 B2 | 11/2004 | Martin |
| 7,063,196 B2 | 6/2006 | Wakabayashi et al. |
| 7,380,645 B1 | 6/2008 | Ruiz |
| 2001/0025759 A1 | 10/2001 | Sarar |
| 2005/0126877 A1 | 6/2005 | Schneider et al. |
| 2007/0113803 A1* | 5/2007 | Froloff et al. .............. 123/90.11 |
| 2008/0099258 A1 | 5/2008 | Berhan |
| 2009/0314591 A1 | 12/2009 | Suppiah |
| 2010/0113216 A1 | 5/2010 | Avny et al. |
| 2010/0332089 A1* | 12/2010 | Gianone et al. ................. 701/51 |

FOREIGN PATENT DOCUMENTS

| | | |
|---|---|---|
| JP | 52031258 | 3/1977 |
| JP | 61235219 | 10/1986 |
| JP | 03189419 | 8/1991 |
| JP | 3209029 | 9/1991 |
| JP | 04029622 | 1/1992 |
| JP | 05106642 | 4/1993 |
| JP | 07310755 | 11/1995 |
| JP | 11254981 | 9/1999 |

* cited by examiner

VEHICLE WITH TRANSMISSION COOLING SYSTEM

TECHNICAL FIELD

The present disclosure relates to cooling systems for dry-clutch transmissions, more specifically transmission cooling systems that support other vehicle subsystems.

BACKGROUND

Dry clutch transmissions tend to provide higher coefficients of friction than wet clutches, however, dry clutches may have more thermal management issues. Some powershift dry dual-clutch transmissions (or "DCTs") comprise a manual clutch construction, e.g., as disclosed in U.S. Patent Publication No. 2010/0113216 titled "Temperature Control of Dual Input Clutch Transmission," which is herein incorporated by reference in its entirety. The '216 publication teaches the use of a controlled fan to improve cooling in the transmission. The indirect air flow path from the fan to the heat source can slow down the cooling process.

Another way to manage dry-clutch transmission temperatures is to link an air tank to the transmission housing. Japanese Patent Publication No. JP3209029 titled "Cooling Device for Electromagnetic Coupling Device With Magnetic Particle" to Kazou et al. discloses an air compressor driven by the exhaust energy of an engine configured to produce compressed air stored in a reserve tank that is in fluid communication with the transmission housing. This design requires a reserve tank which can add weight to the vehicle and increase part costs.

Therefore, it is desirable to have a dry-clutch transmission with a streamlined cooling system that can directly pressurize the transmission clutch housing. Moreover, it would be beneficial to have other vehicle subsystems tap into the compressed air provided by the transmission cooling system to reduce parts, assembly time and vehicle weight.

SUMMARY

The present invention may address one or more of the above-mentioned issues. Other features and/or advantages may become apparent from the description which follows.

Certain embodiments of the present invention relate to a control circuit for a vehicle transmission cooling system, including: a controller configured to control an air compressor to selectively pressurize a transmission clutch housing and provide air to an alternative vehicle subsystem.

Another exemplary embodiment of the present invention relates to a vehicle transmission cooling system, including: an air compressor configured to pressurize a transmission housing; an alternative vehicle subsystem in fluid communication with the air compressor; and a controller configured to control the air compressor.

Yet another exemplary embodiment of the present invention relates to a vehicle including: a dry-clutch transmission; an air compressor configured to selectively pressurize a clutch housing of the transmission; and a controller configured to control the distribution of air between the compressor and clutch housing. The air compressor is in fluid communication with an alternative vehicle subsystem.

Another exemplary embodiment of the present invention relates to a control circuit for a vehicle transmission cooling system, including: a controller configured to control an air compressor to selectively pressurize a transmission clutch housing. The controller is configured to receive data related to engine speed, accelerator pedal position, clutch slip, battery load capacity or clutch housing pressure and restrict compressor operation based on the data.

Preliminary test data demonstrates that pressurizing the clutch housing to 1.3 bar (or 20 psi) above atmospheric pressure generates a steeper temperature drop than the use of an external fan. Clutch temperature drops faster with this cooling method. This enables more frequent launch events prior to reaching the clutch temperature limits.

Another benefit provided with the present teachings is that an air compressor is likely to be similar in cost to an external fan but can have multiple utility with respect to vehicle subsystems.

Another benefit to the present teachings is that they provide more compact and flexible vehicle packaging options. In some embodiments, the compressor is remotely located with respect to the transmission clutch housing and uses a relatively small hose.

Another benefit to the present teachings is that the pressurized clutch housing prevents environmental contamination from water or debris (because it is sealed, versus open to large inlet and outlet ducts).

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, wherein like characters represent the same or corresponding parts throughout the several views there are shown exemplary transmission cooling systems. The cooling systems shown are configured to reduce input clutch overheating at least by providing compressed air into a transmission clutch housing. The cooling systems are configured for use with dry-clutch transmissions. The shown embodiments are manual transmissions; however, the transmissions can be any type of transmission including and an automated manual transmission or dual clutch automatic transmission. The cooling systems provide additional functionality in that the air compressors are in fluid communication with an alternative vehicle subsystem (e.g., a vehicle suspension system or a tire servicing center). In this manner, the cooling systems provide additional utility to the vehicle while decreasing the parts and weight of the overall vehicle.

Figure 1:
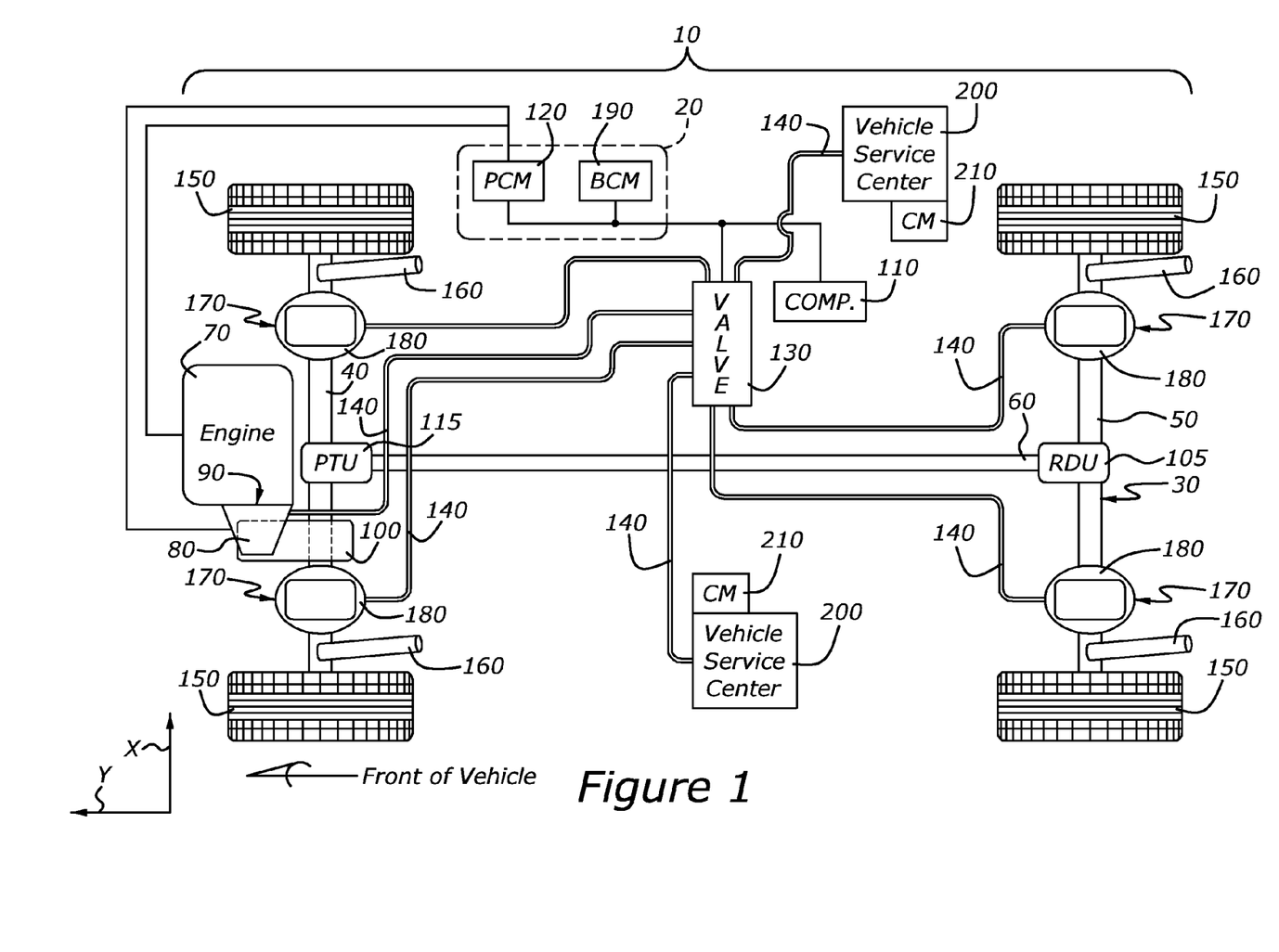
FIG. 1 is a top view of a vehicle having an exemplary control circuit for a transmission cooling system and alternative vehicle subsystems.

Referring now to FIG. 1, there is shown therein a top view of a vehicle 10 having an exemplary control circuit 20 for a transmission cooling system and an alternative vehicle subsystem. The vehicle 10 can be any type of vehicle including, for example, a front-/rear-/all-wheel drive vehicle; a sedan, coupe, sport utility vehicle, truck or crossover. A chassis 30 for the vehicle 10 is schematically shown. The chassis 30 includes a front axle 40 and rear axle 50 interconnected by the main axle 60. Vehicle 10 has a powertrain. The powertrain includes an engine 70—such as an internal combustion engine—and a transmission 80 with clutch housing 90 connected to the engine crankshaft. Transmission 80 is linked to a differential 100 connected to the vehicle driveline (not shown). The illustrated vehicle 10 is an all-wheel drive vehicle having a rear differential unit 105. Torque is also transferred to the front axle through a power take-off unit 115.

The illustrated vehicle 10 of FIG. 1 further has a cooling system. Cooling system includes an air compressor 110 configured to pressurize the transmission clutch housing 90. The air compressor 110 is linked to a controller 120. The controller 120 is designed to not only control the distribution of compressed air to the clutch housing 90 but also the distribution of air to an alternative vehicle subsystem (such as, for example, a suspension system, or tire servicing center).

Compressor 110 is a 12V air compressor connected to the vehicle's main battery (not shown). Compressor 110 is capable of pressurizing the clutch housing 90 to at least 20 psi (or 1.3 bar) above atmospheric pressure. A target pressurization range is between 0.65 and 2.07 bars (or approximately 10 and 30 psi). A 50-60 psi (or 3.45-4.14 bars) capacity compressor is used in one embodiment. Air compressor 110 is connected to a control valve 130. Valve 130 is an electromechanical valve (such as a solenoid valve) configured to control the distribution of compressed air from compressor 110 to clutch housing 90. In this embodiment, a hose 140 feeds air from the valve 130 to the clutch housing 90. In another embodiment, a valve is not used to control the distribution of fluid between the air compressor and clutch housing. Air distribution is governed only be activation and deactivation of the air compressor.

Powertrain control module (or PCM) 120 is linked to the valve 130 and air compressor 110. The PCM 120 at least partially defines the control circuit 20 for the transmission cooling system. PCM 120 includes logic to control the compressor 110 in selectively pressurizing the clutch housing 90. PCM 120 and/or other control modules govern the distribution of air to alternative vehicle subsystems. With respect to the PCM 120, PCM includes thermal logic to receive data related to the operating temperature for any of the transmission clutches including the input clutch. Thermal logic includes a predetermined threshold for clutch temperature. In this embodiment, the predetermined threshold is 225 degrees Celsius. In other embodiments, the predetermined threshold is higher or lower than 225 degrees Celsius. Once the input clutch temperature exceeds the threshold, air compressor 110 is turned on and valve 130 releases air to the clutch housing 90. Though PCM 120 is shown separate from the other control modules, PCM can be included in the same controller as other vehicle control modules.

Vehicle chassis 30, as shown in FIG. 1, supports four wheels 150 connected to the vehicle's driveline. A vehicle suspension system is also shown in FIG. 1. The suspension system includes four primary shock absorbers 160 positioned with respect to each wheel 150. The primary shock absorbers 160 are twist tube shocks having a preset damping. Suspension system also includes four springs 170. Springs 170 include air bladders 180 in fluid communication with the air compressor 110. Springs 170 have an adjustable height—compressed air is used to alter the height of the vehicle body with respect to front and rear axles, 40 and 50. Each air bladder 180 is connected to the compressor 110 through a hose 140. Hoses 140 are linked to a designated connection in the valve assembly 130.

A body control module (or "BCM") 190, as shown in FIG. 1, controls the valve 130 and air compressor 110 according to predetermined conditions. For example, as discussed with respect to FIG. 3, springs 170 can be inflated where a gap between the chassis 30 (e.g. an axle) and vehicle body is under/over a preset threshold. Springs 170 (as shown in FIG. 1) can be inflated to different heights. Springs 170 on the rear axle 50 can be adjusted to a height that is different than the springs at the front axle 40. Though BCM 190 is shown separate from the other control modules, BCM can be included in the same controller as the PCM or vehicle control modules.

The vehicle 10 in FIG. 1 also includes a vehicle service center 200. The service center 200 provides driver access to compressed air. Service center 200 includes a user interface through which tire pressure can be accessed and tires or other inflatable articles can be inflated. In this embodiment, the vehicle 10 includes a service center 200 on the driver and passenger side of the vehicle. Compressed air can also be used to inflate other devices such as other vehicle tires, bicycle tires, sporting/camping equipment, pneumatic tools, or other items. In this embodiment, each vehicle service center 200 is linked to the air compressor 110 and valve 130. Vehicle service center 200 includes a controller 210 to process user requests for air and monitor tire pressure. Tire pressure can be monitored through wireless tire pressure sensors incorporated into the vehicle wheels 150. A pressure sensor can also be incorporated into a pressure gauge for the vehicle service center 200 to take pressure readings when the vehicle is stationary. Control modules 210 communicate user commands and status updates between the air compressor 110 and service center 200. Control modules 210 can be separate from the other control modules, as shown, or modules can be included in the same controller as other vehicle control modules (or controllers). Bluetooth or other wireless networks can be used to support communication of the service centers 200 to other vehicle components, e.g., tire pressure monitoring systems. Wireless protocols including, but not limited to, those in conformance with IEEE standard 802.11 et seq. can be implemented to enable wireless communication between any of the vehicle service center 200, air compressor 110, electromechanical valve 130, PCM 120, BCM 190, control modules 210 or other vehicle controllers. In the illustrated embodiment, PCM 120, BCM 190 are hardwired, via a multiplex controller area network or CAN, configured to communicate through the vehicle's serial bus. Control modules 210 can be hardwired to the CAN or wirelessly linked to the vehicle bus.

Figure 2:
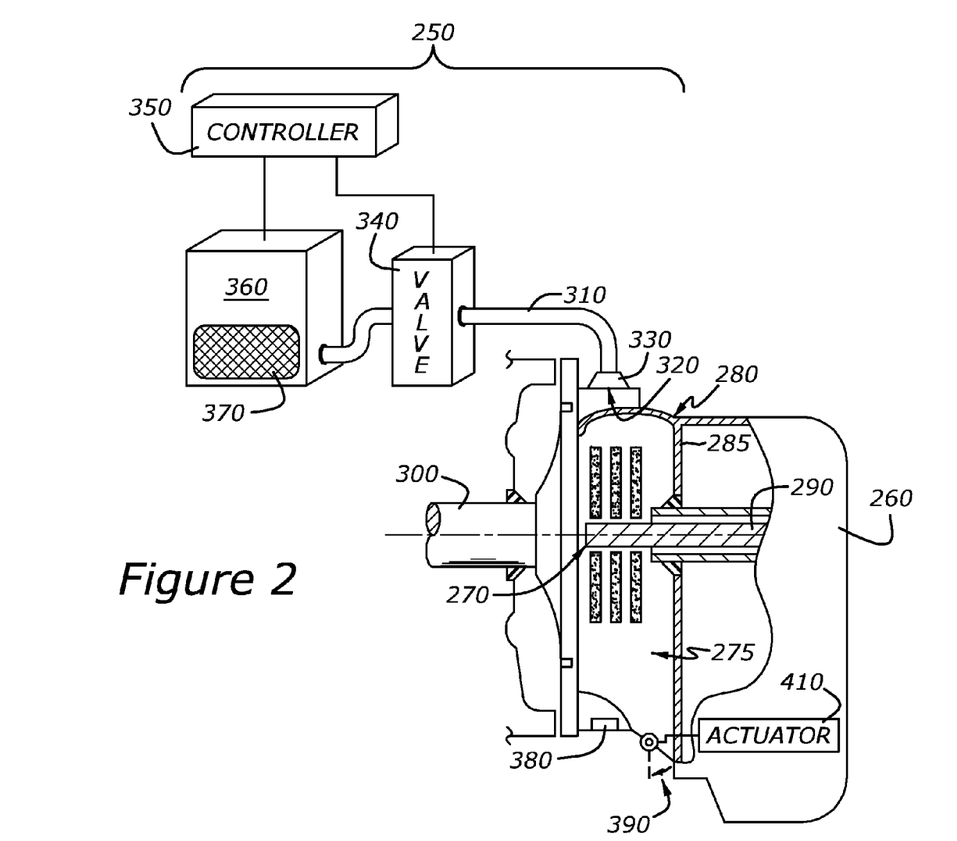
FIG. 2 is an exemplary transmission cooling system.

Referring now to FIG. 2, there is shown therein an exemplary transmission cooling system 250 compatible with vehicle 10 of FIG. 1. In FIG. 2, transmission 260 is a dry clutch transmission. The transmission 260 represents a dual-clutch transmission with multiple input clutches mounted in parallel. Shown in FIG. 2, is one input clutch 270 configured to engage an input shaft 290 and engine crankshaft 300. Clutch 270 is in an air cavity 275 enclosed by the transmission clutch housing 280. Transmission 260 is linked to the cooling system 250 which is configured to reduce clutch temperature upon command. The clutch housing 280 can be sealed off from the environment, eliminating concern of water or debris contamination. As shown, the cooling system 250 is linked to the clutch housing 280 through a hose 310. Hose is connected, at one end, to an orifice 320 in the clutch housing 280. Hose 310 is a small polymer hose routed to the clutch housing 280. A snap-fit connect 330 is included at the end of the hose 310 to provide an air-tight seal between hose and the clutch housing 280. In this embodiment, the orifice 320 is positioned superadjacent the input clutch 270; however, orifice 320 can be positioned anywhere with respect to the clutch housing 280. In other embodiments the pressure feed orifice 320 is located on the side or bottom of the clutch housing 280.

Hose 310 is connected to a control valve 340. Controller 350 controls the valve 340. Controller 350 can be the PCM (as shown in FIG. 1) or any other vehicle control module. Air compressor 360 is remotely mounted in the vehicle with respect to the transmission 260. The air compressor 360 is also linked to the control module 350. Air compressor 360 includes a filtered inlet 370 so as to utilize ambient air. The inlet 370 is located high in the vehicle. Controller 350 governs air compressor 360 and distribution of air through the control valve 340 according to housing pressure readings and the clutch temperature.

A pressure sensor 380, as shown in FIG. 2, is included in the clutch housing 280 to measure the pressure therein. Pressure sensor 380 is linked to the controller 350 and feeds pressure readings to the controller. The cooling system 250 is configured to raise the pressure in the clutch housing 280 at least up to one atmosphere range—e.g., 1 bar—when high clutch temperatures are calculated or expected. A 1 bar pressure capacity compressor is used in one arrangement. This pressurization improves heat transfer out of the clutch flywheel and pressure plate. In one embodiment, pressure sensor 380 takes pressure measurements from an orifice formed in clutch housing 280. In other embodiments, pressure sensor 380 is located in valve 340.

In the embodiment of FIG. 2, the controller 350 is configured to infer clutch 270 temperature. In the shown embodiment, clutch temperature is inferred based on inputs related to engine speed, input shaft speed, engine torque and clutch torque. Inputs can be measured or inferred from other data. Clutch temperature is inferred from the relative speed between the engine and input shaft—or clutch slip. The power distribution or energy transfer rate is derived from clutch slip—the difference in clutch input power and engine output power—and used to infer clutch temperature. Clutch temperature is equal to the power generated by clutch slip minus any heat transfer losses out of the clutch. Additional inputs that can be supplied to the PCM 350 to infer clutch temperature include the specific heat of the clutches, the rate of heat convection from the clutches, the weight and thermal conductivity of the clutches, the ambient temperature, coefficient of friction of the clutch surfaces, and initial temperature of the clutches. PCM 350 is configured to calculate the rate of change of rotating power absorbed by the clutches from this data. In another embodiment, thermocouples are included in the transmission housing and configured to measure clutch housing temperature. In yet another embodiment, measurements from thermocouples positioned at two different points in the clutch housing are used to derive clutch temperature. The difference in temperature readings between two or more thermocouples is used to calculate clutch heat dissipation and infer clutch temperature. Where the clutch temperature exceeds a predetermined threshold the controller sends compressed air to the clutch housing.

In the illustrated embodiment of FIG. 2, clutch housing 280 is sealed from the remainder of transmission 260 with a separation wall 285. This creates a metal-to-metal sealing surface which can have some fluid leakage. In one embodiment, control valve 340 includes a pressure relief valve that exhausts compressor air from the valve under predetermined conditions. For example, when the pressure in the clutch housing 280 exceeds a threshold (e.g., 1.5 bar) the pressure relief valve is actuated. The pressure relief valve can be any sort of electromechanical valve, such as a solenoid valve.

In the embodiment shown in FIG. 2, an adjustable vent 390 is included in the clutch housing 280 to control significant air flow when desired. The vent 390 is shown as a pivotable cover at the base of the clutch housing 280. The cover is actuable. An actuator 410 is provided to control cover position. Actuator 410 can be a linear or digital actuator configured to position the cover in two or more positions. Actuator 410 is remotely linked to the PCM 350. Upon command the vent 390 is opened or closed. As shown in phantom, the vent cover is open. In another embodiment, vent 390 can be any sort of adjustable orifice, such as for example, a slot with slide-adjust cover or an inflatable seal. In this embodiment, PCM 350 is configured to close the vent 390 when the clutch temperature is in excess of a predetermined threshold. Once the clutch housing 280 has been pressurized for a predetermined time period vent 390 is opened. In one embodiment, PCM 350 is configured to open vent 390 after the clutch housing 280 is pressurized for 230 seconds (or approximately 15 seconds under four minutes). In another embodiment, vent is controlled according to clutch temperature. Where the clutch temperature falls below a predetermined threshold, vent is instructed to open by PCM. Cooling system 250, of FIG. 2, can also be implemented on preexisting transmissions. Existing orifices can be closed using, for example, metal sealing.

Figure 3:
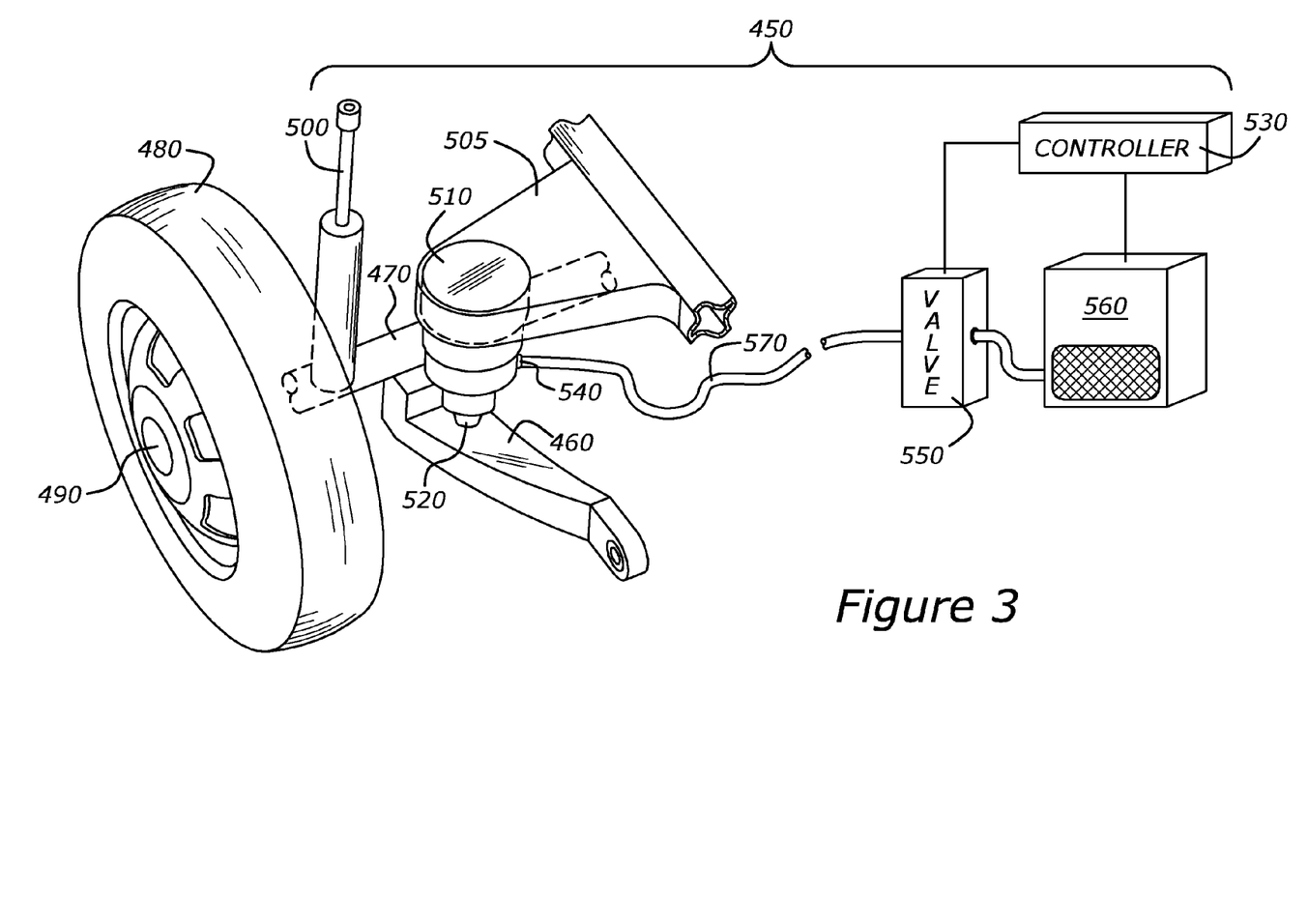
FIG. 3 is a perspective view of an exemplary vehicle suspension system.

Now with reference to FIG. 3, there is shown therein a portion of an exemplary vehicle suspension system 450 compatible with vehicle 10 of FIG. 1. In FIG. 3, the suspension system 450 is mounted with respect to the vehicle suspension link 460 and axle 470. As shown, a wheel with tire 480 is connected to the axle 470 through wheel hub 490. Suspension system 450 includes a primary shock absorber 500 and an air spring 510. A coil spring or leaf spring can be added to the suspension system 450 shown in FIG. 3. In other embodiments, spring 510 is a coil spring or leaf spring composed of a metal or polymer composite. Primary shock absorber 500 is a (twist) tube shock absorber. Shock absorber 500 is a pneumatic damper configured to damp motion from the wheel 480 to the vehicle structure. Mounted with respect to the axle 470 is a vehicle suspension link 460 extending in the longitudinal direction of the vehicle or direction of travel.

Spring 510, as shown in FIG. 3, is mounted with respect to the axle 470 and suspension link 460. Spring 510 includes a height sensor 520 configured to measure the displacement between the suspension link 460 and vehicle structure 505. Height sensor 520 can be a potentiometer, for example. Height sensor 520 is linked to the body control module (or BCM) 530 and is configured to send measurements related of vehicle ground clearance to the BCM. Spring 510 includes an air bladder 540 configured to adjust the height of the vehicle main body structure 505 with respect to the suspension link 460. Default settings can be adjusted according to height measurements. BCM 530 includes logic to provide compressed air to spring 510 upon command. In this embodiment, BCM 530 is configured to control a control valve 550 and air compressor 560. When vehicle load changes cause a ground clearance greater than 20 millimeters BCM 530 decreases the main body height by 10 millimeters. In another embodiment, spring 510 pressure is governed according to user command. If a specific vehicle mode of operation—e.g., off-road—is input into BCM, spring 510 can be adjusted to stiffen the spring rate and raise the vehicle ride height. In one embodiment, spring 510 is adjusted according to vehicle speed. Ground clearance is added at lower speeds, e.g. less than 50 miles per hour. Ground clearance is reduced at speeds greater than 50 mph. Rear axle height adjustment can also be used for load compensation and to assist in vehicle egress and ingress. Front axle adjustment can be used for improvement of fuel economy, load compensation and to assist in vehicle egress and ingress.

As shown, in FIG. 3, the suspension system 450 is linked to the air compressor 560 through a hose 570. Hose 570 is connected, at one end, to the air bladder 540. Hose 570 is connected to the control valve 550. Air compressor 560 is remotely mounted in the vehicle with respect to the spring 510 and is commonly shared with a transmission cooling system (e.g., as shown in FIG. 2).

Figure 4:
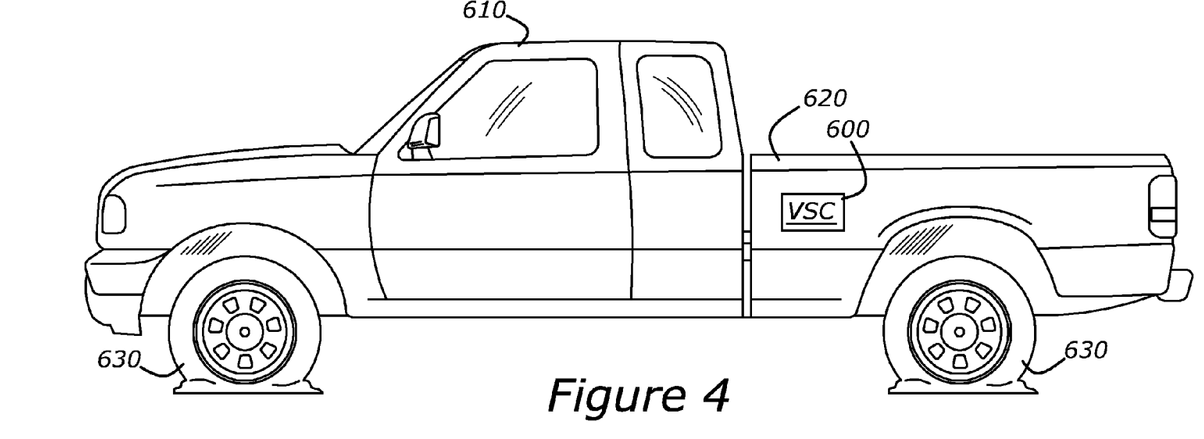
FIG. 4 is a side view of a vehicle with an exemplary vehicle service center.
Figure 5:
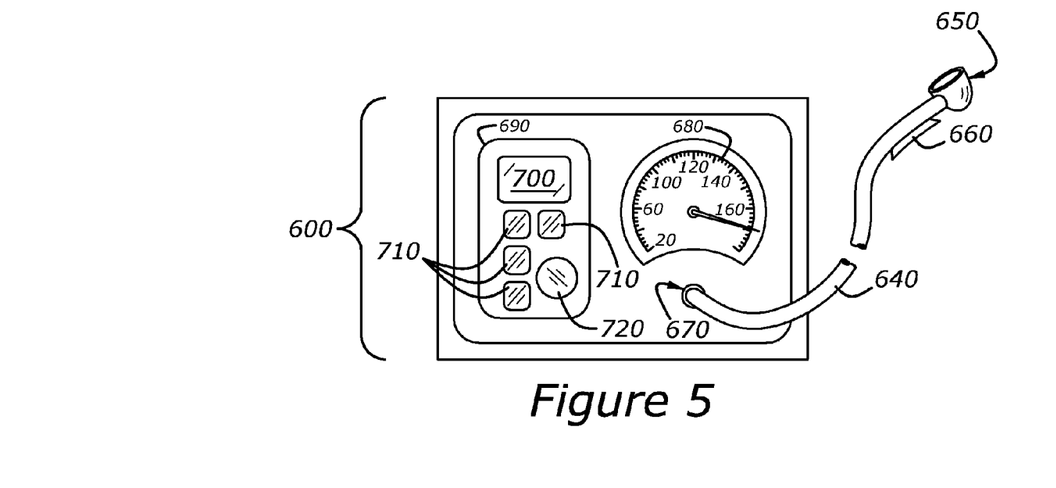
FIG. 5 is the vehicle service center of FIG. 4.

An air compressor is also linked to an exemplary vehicle service center 600 as illustrated in FIGS. 4 and 5. Vehicle service center 600 is also compatible with vehicle 10 of FIG. 1. Vehicle service center 600, of FIG. 4, is included on vehicle 610. Vehicle 610 is a pick-up truck with full-length truck bed 620. As shown, vehicle 610 has two deflated tires 630. One vehicle service center 600 is provided on the side of the vehicle 610. Compressed air is made accessible externally through the vehicle service center 600 located on the vehicle side panel of truck bed 620. In other embodiments, vehicle service center 600 can be located anywhere with respect to the vehicle including, for example, the interior of the truck bed or vehicle cabin, the rear portion of the vehicle, underneath the hood, or in the underbody.

Vehicle service center 600, as shown in FIG. 5, is configured to provide compressed air to an inflatable article, such as a vehicle tire or trailer tire. Vehicle service center 600 has a retractable hose line 640 connected to an air compressor (e.g., as shown in FIG. 1). At one end of the hose 640 is a nozzle 650 compatible with a tire valve. Hose 640 also includes a handle 660. Hose 640 is spring-loaded by a rotational spring so that hose can be stowed. Vehicle service center 600 includes an orifice 670 for hose 640. Also included is a pressure gauge 680. Pressure gauge 680 is configured to measure pressure readings with respect to the inflatable article, e.g., a vehicle tire.

Vehicle service center 600, as shown in FIG. 5, has a user interface panel 690 linked to a control module (e.g., as shown in FIG. 1). User interface 690 has a screen 700 to communicate information to the user. Interface 690 also comprises a series of buttons 710 and/or knobs 720 to communicate user commands to the control module and air compressor. For example, knob 720 can be designated as an on/off switch for the compressor. Knob 720 can also be an analogue transmitter configured to linearly control the scale of the air compressor. Buttons 710 can be, for example, soft keys or spring-mounted keys. Buttons 710 can be configured to control hose retraction, air compressor functionality, screen lighting, or other functions.

Figure 6:
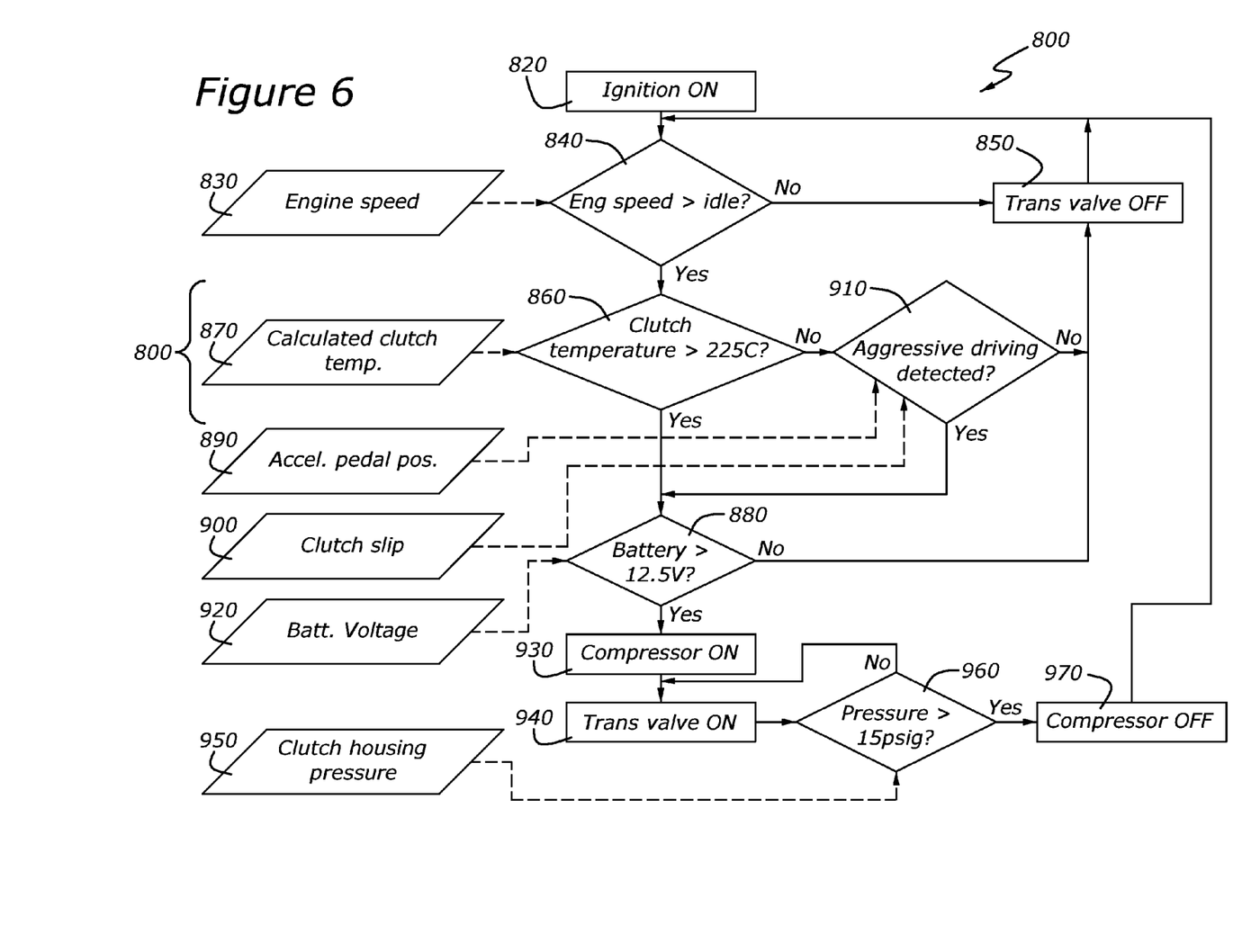
FIG. 6 illustrates control logic for a transmission cooling system.

An exemplary control logic 800 for a controller configured to govern an air compressor and/or control valve is shown in FIG. 6. A controller can be programmed to execute control logic 800. Control logic 800 includes thermal logic 810 designed to assess a clutch temperature and control the distribution of air from the compressor to the transmission when the clutch temperature exceeds a predetermined threshold. Logic controls 800 an exemplary transmission cooling system (e.g., as shown and discussed with respect to FIG. 2).

The program 800 begins when the ignition is turned on at step 820. The controller is configured to receive input data related to several vehicle functions. First, controller processes information related to engine speed at 830. Engine speed data can be obtained from the engine control unit which can be included in the PCM. Engine speed is compared to idle at step 840. If the engine speed is less than idle (or zero) the program sends a command signal to the control valve to close the connection between the air compressor and transmission bell housing, as shown at step 850. Air compressor is restricted from activation. The program is a closed-loop function and returns to checking the engine speed 840 until the engine speed is greater than idle. Where the engine speed is greater than idle the program continues to step 860. At step 860, the program compares clutch temperature to a predetermined threshold. Clutch temperature can be measured or inferred, as discussed above, and fed into controller at step 870. In the illustrated embodiment, the predetermined threshold is 225 degrees Celsius. If clutch temperature is in excess of the set threshold, the program proceeds to step 880.

As illustrated, if the clutch temperature threshold is not exceeded, controller is configured to receive data related to an accelerator pedal position and clutch slip at 890 and 900, respectively. Logic is configured to detect whether an aggressive driving condition is detected at step 910. In this embodiment, aggressive driving conditions are defined as the accelerator pedal position being applied more than 50% and/or high clutch slip detected. Accelerator position can be measured through throttle position or a position sensor located on the foot pedal. In one embodiment, if the throttle is fully applied control logic 800 characterizes this condition as aggressive driving. Where an aggressive driving condition is met the logic continues to step 880. If clutch slip is detected the logic recognizes this as an aggressive driving condition as well. Clutch slip can be detected from the comparative speed of the engine and input clutch when applied. These comparative speeds can be obtained from stored date in the PCM. If the driving conditions do not meet either of these prerequisites, the program goes to step 850 and the control valve is closed. If an aggressive driving condition is detected logic continues to the next step 880.

This embodiment of the control logic 800 includes a power test for the battery before the air compressor is turned on. In this way, the control logic 800 ensures that the vehicle's battery is not overloaded by running the air compressor. The battery load capacity is fed into the controller at step 920. Battery load capacity can be assessed through a voltmeter for example. Battery load capacity is compared to a predetermined threshold at step 880. Where the load capacity is greater than the predetermined threshold, the logic continues to step 930 to turn the compressor on. If the load is less than the threshold the system goes to step 850, closing the control valve and returning back to start. Air compressor activation is restricted or conditional to battery load capacity. In this embodiment, the threshold is 12.5 volts. In other embodiments, the threshold load can be higher or lower than 12.5 volts.

Steps can be in a different order than shown in FIG. 6. For example, battery load capacity may precede driving condition assessment or engine speed determinations. It is not necessary that all steps be programmed into control logic for the cooling system. Any one of the steps or different combinations of steps can be implemented in the control logic. In other embodiments, the some steps individually serve as prerequisites to air compressor activation or control valve opening.

After the compressor is turned on, the control valve is actuated to enable air to flow to the transmission housing, as shown at step 940 of FIG. 6. Air is provided to the housing until the housing is pressurized to a threshold value. In this embodiment, the target threshold is 1 bar (or approximately 15 psi) above atmospheric pressure. At step 950 data related to the pressure in clutch housing is fed into the controller. Logic includes a conditional step 960 to loop the program to keep the control valve open until the target pressure is achieved. Where the set pressure is exceeded program 800 turns the compressor off at step 970 continues to step 850. The program then goes back to the initial program step until a condition that reactivates the compressor or control valve is detected.

In other embodiments, control logic is configured to receive data from other vehicle subsystems including the vehicle suspension and vehicle service center. Air compressor performance and control valve can be governed according to those conditions, for example, as discussed hereinabove.

Algorithm can be programmed into any vehicle control module including, for example, the PCM or BCM. Sensors can be hardwired or wirelessly linked to the control units to input relevant data. Vehicle conditions are stored in controller memory such as random access memory (RAM) or keep alive memory (KAM). Control logic can be stored in read only memory (ROM).

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

Those familiar with the art to which this invention relates will recognize various alternative designs and embodiments for practicing the invention within the scope of the appended claims.

We claim:

1. A vehicle comprising:
a dry-clutch transmission;
an air compressor configured to selectively pressurize a clutch housing of the transmission; and
a controller configured to control the distribution of air between the compressor and clutch housing and receive data related to a battery load capacity and restrict compressor operation based on battery load;
wherein the air compressor is in fluid communication with an alternative vehicle subsystem.

2. The vehicle of claim 1, further comprising:
an electro-mechanical valve between the air compressor and clutch housing;
wherein the controller is configured to control the valve.

3. The vehicle of claim 2, wherein the controller comprises thermal logic, the thermal logic configured to assess a clutch temperature and control the distribution of air from the compressor to the transmission when the clutch temperature exceeds a predetermined threshold.

4. The vehicle of claim 3, wherein the predetermined threshold is between 150 and 250 degrees Celsius.

5. The vehicle of claim 3, wherein when the clutch temperature exceeds the predetermined threshold, a target pressurization range for the transmission is between 0.65 and 2.1 bars.

6. The vehicle of claim 1, wherein the controller is configured to receive data related to engine speed and restrict compressor operation based on engine speed.

7. The vehicle of claim 1, wherein the controller is configured to receive data related to an accelerator pedal position and restrict compressor operation based on accelerator pedal position.

8. The vehicle of claim 1, wherein the controller is configured to receive data related to clutch slip and restrict compressor operation based on detection of clutch slip.

9. The vehicle of claim 1, wherein the compressor is remotely located with respect to the clutch housing.

10. The vehicle of claim 1, wherein the alternative vehicle subsystem is a suspension system.

11. The vehicle of claim 1, wherein the alternative vehicle subsystem is a tire service center.

* * * * *